(12) United States Patent
Cohen (10) Patent No.: US 8,261,190 B2
(45) Date of Patent: Sep. 4, 2012

(54) DISPLAYING HELP SENSITIVE AREAS OF A COMPUTER APPLICATION

(75) Inventor: Mark B Cohen, London (GB)

(73) Assignee: Burlington Education Ltd., Limassol (CY)

( * ) Notice: Subject to any disclaimer, the term of this patent is extended or adjusted under 35 U.S.C. 154(b) by 531 days.

(21) Appl. No.: 12/429,995

(22) Filed: Apr. 24, 2009

(65) Prior Publication Data

US 2009/0271704 A1    Oct. 29, 2009

Related U.S. Application Data

(60) Provisional application No. 61/047,687, filed on Apr. 24, 2008.

(51) Int. Cl.
*G06F 3/00* (2006.01)
(52) U.S. Cl. ...................................... 715/708
(58) Field of Classification Search .................. 715/710, 715/711, 715, 808, 835, 846, 706, 707, 708, 715/709, 714
See application file for complete search history.

(56) References Cited

U.S. PATENT DOCUMENTS

| | | | | |
|---|---|---|---|---|
| 5,825,355 A | * | 10/1998 | Palmer et al. | 715/712 |
| 5,995,101 A | * | 11/1999 | Clark et al. | 715/711 |
| 7,594,193 B2 | * | 9/2009 | Thomas | 715/835 |
| 7,945,846 B2 | * | 5/2011 | Beauchamp et al. | 715/201 |

* cited by examiner

*Primary Examiner* — Thanh Vu
(74) *Attorney, Agent, or Firm* — Kilpatrick Townsend & Stockton LLP (57) ABSTRACT

A window of a computer application on a display device is controlled through associating a pop-up window with the screen window of the computer application, wherein the computer application provides more than one screen window and a pop-up window is associated with each screen window of the computer application, and at least one mouse-sensitive area is defined for each screen window of the computer application, such that a mouse click on a mouse-sensitive area causes the appropriate pop-up window to be displayed on the display device.

16 Claims, 7 Drawing Sheets

DISPLAYING HELP SENSITIVE AREAS OF A COMPUTER APPLICATION

CROSS-REFERENCES TO RELATED APPLICATIONS

This application claims the benefit of U.S. Provisional Application Ser. No. 61/047,687 entitled "Displaying Help Sensitive Areas of a Computer Application" by Mark B. Cohen filed Apr. 24, 2008. Priority of the filing date is hereby claimed, and the disclosure of the prior application is hereby incorporated by reference.

COPYRIGHT NOTICE

A portion of the disclosure of this patent document contains material which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

It is known to provide a computer software application user with assistance by defining mouse-sensitive areas on a screen window of the application as presented on a display device. Whenever the user clicks on a mouse-sensitive area, a pop-up help window is produced on the display device and provides help and/or support information (either text and/or graphics) associated/linked to the information presented in the mouse-sensitive area.

One problem is how to indicate to the user what areas are mouse-sensitive for requesting help. One technique is to graphically mark the mouse-sensitive areas for help. The marking can be provided in different ways. For example, text can be presented with a different color, underlined, or the color and/or style can be changed when a display mouse is passing over the sensitive area. Other techniques will be known to those skilled in the art. But by doing so, the overall look and feel of the screen may be affected. This can defeat the advantages of an otherwise "What You See Is What You Get" (WYSIWYG) user interface.

SUMMARY

The need for indicating to a software application user the location, on the window screen, of one or more mouse sensitive areas for information and help support is addressed, while maintaining the screen "look and feel" of the software application.

According to the description herein, a special HelpSpots information button or display icon is added on the application window display. The HelpSpots information button does not interfere with the display of the application, thereby preserving any WYSIWYG operation. Whenever a user clicks on the HelpSpots information button, the application operation is changed from a normal (unaltered) screen appearance into an information mode that "freezes" the application display (i.e. all buttons and activities, except mouse-sensitive areas for information, are disabled) and mouse-sensitive areas on the screen are indicated. The indication of mouse-sensitive areas may be implemented with display icons, highlighting, underlining, shading, and similar window effects. When the indicated mouse-sensitive areas are clicked on by the user, farther information such as help and application assistance are provided. The assistance will typically be in the form of application help information. The display areas not so indicated (i.e., not mouse-sensitive) are not sensitive to mouse interaction. That is, user interaction by mouse clicking in those areas will have no effect on application operation and there will be no change in the window. In this way, the user can easily become familiar with the areas of the screen where help can be provided, without affecting the screen "look and feel".

Other features and advantages of the present invention should be apparent from the following description of the preferred embodiments, which illustrate, by way of example, the principles of the invention.

DETAILED DESCRIPTION

Figure 1:
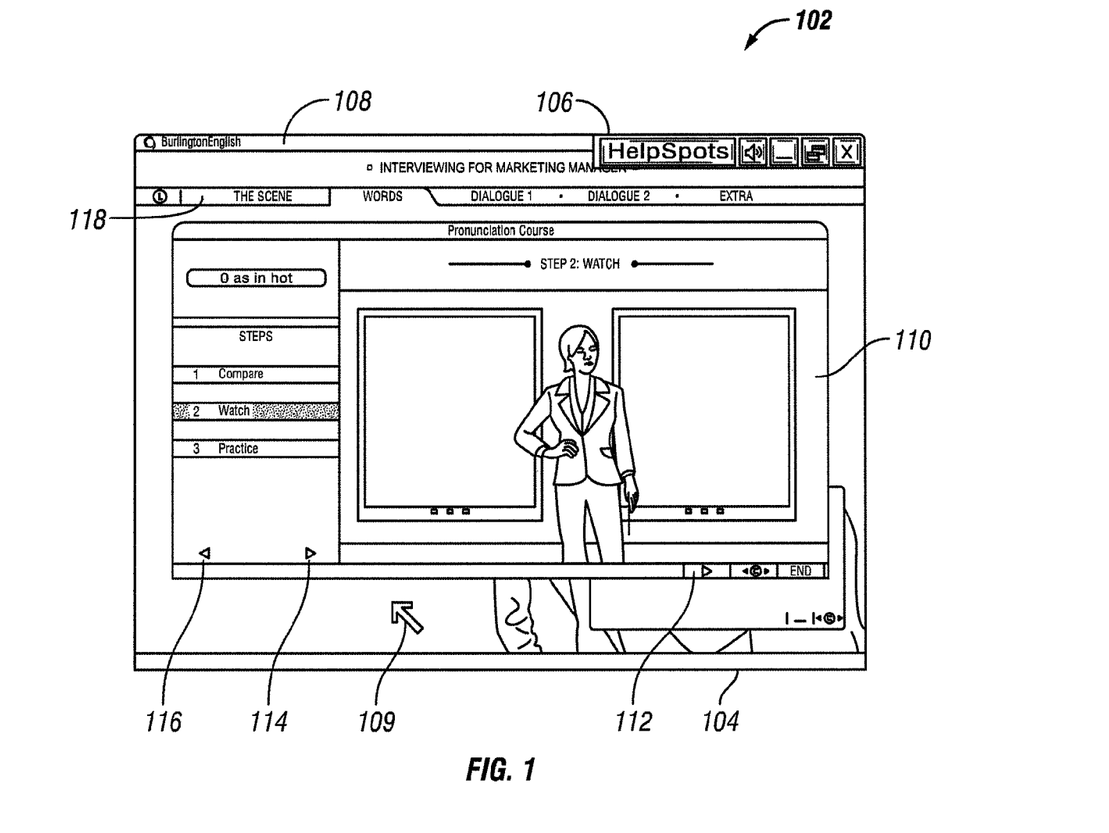
FIG. 1 shows output of the software application presented on a display device.

FIG. 1 shows a display screen 102 of a computer system in which a software application is executing such that an application window 104 shows a "HelpSpots" information toolbar 106 in the window title bar 108, in the right upper corner of the application window. The HelpSpots information toolbar 106 provides convenient access to assistance by the user, and can be moved by the user and located in another area of the application window during execution of the application. For the exemplary software application illustrated in FIG. 1 (identified as "BurlingtonEnglish" in the title bar shown 108 in FIG. 1), multiple application window displays are associated with the software application execution. That is, multiple windows will be displayed during execution of the software application in response to user interaction. During execution, the HelpSpots information toolbar 106 will continue to be shown in the application window, across the multiple window displays of the software application. Thus, FIG. 1 illustrates an "idle" or waiting condition of the HelpSpots information toolbar for the "BurlingtonEnglish" software application, which will be referred to as the host application for the toolbar. The computer system on which the host application (and information toolbar) are executed will also be referred to as the host computer system. The software application for which the information toolbar is provided will also be referred to as the host application. The host application may be provided in different configurations, such as installed locally on the host computer system or as a Web-based application. In this exemplary embodiment, the BurlingtonEnglish application provides spoken language learning instruction. A display cursor 109 can be moved about the window 104 by the user.

Unlike more straightforward applications that provide a relatively simple user interface, the BurlingtonEnglish language learning application illustrated in FIG. 1 has several operational features that are user-selectable during execution and whose actions are not necessarily intuitive to the user. For example, the FIG. 1 application shows a smaller "lesson" application window 110 within the larger application window 104, comprising one of the multiple application window displays noted above. The lesson window 110 is referred to as the "active" window of the software application, and is typically shown at greater illumination brightness as compared with inactive windows of the application. Different lesson windows 110 will be displayed within the application window 104 during execution of the application as a user makes progress through application lessons. Users of applications having somewhat complicated user interfaces, such as the illustrated BurlingtonEnglish application, may be assisted by the help-sensitive display areas described herein to quickly learn about operational features of the application that are selected via the application windows.

In FIG. 1, several display buttons of the BurlingtonEnglish application are shown, and each display button is associated with an action or response such that operation of the application and display windows are changed. For example, a "Play" button (▶) 112 in the lower right corner of the lesson application window 110 may initiate playback of a video clip or audio clip by the application. A pair of "forward" (→) 114 and "reverse" (←) 116 buttons in the lower left corner of the lesson window 110 may provide application navigation or may link to other application windows or other display actions of the application. Other program actions will be associated with other display buttons of the FIG. 1 screen window. Other software applications may have features, capabilities, and display artifacts about which a user might want assistance, which can be provided via the HelpSpots information toolbar 106 as described herein. Those skilled in the art will be familiar with such features, capabilities, and display artifacts.

Figure 2:
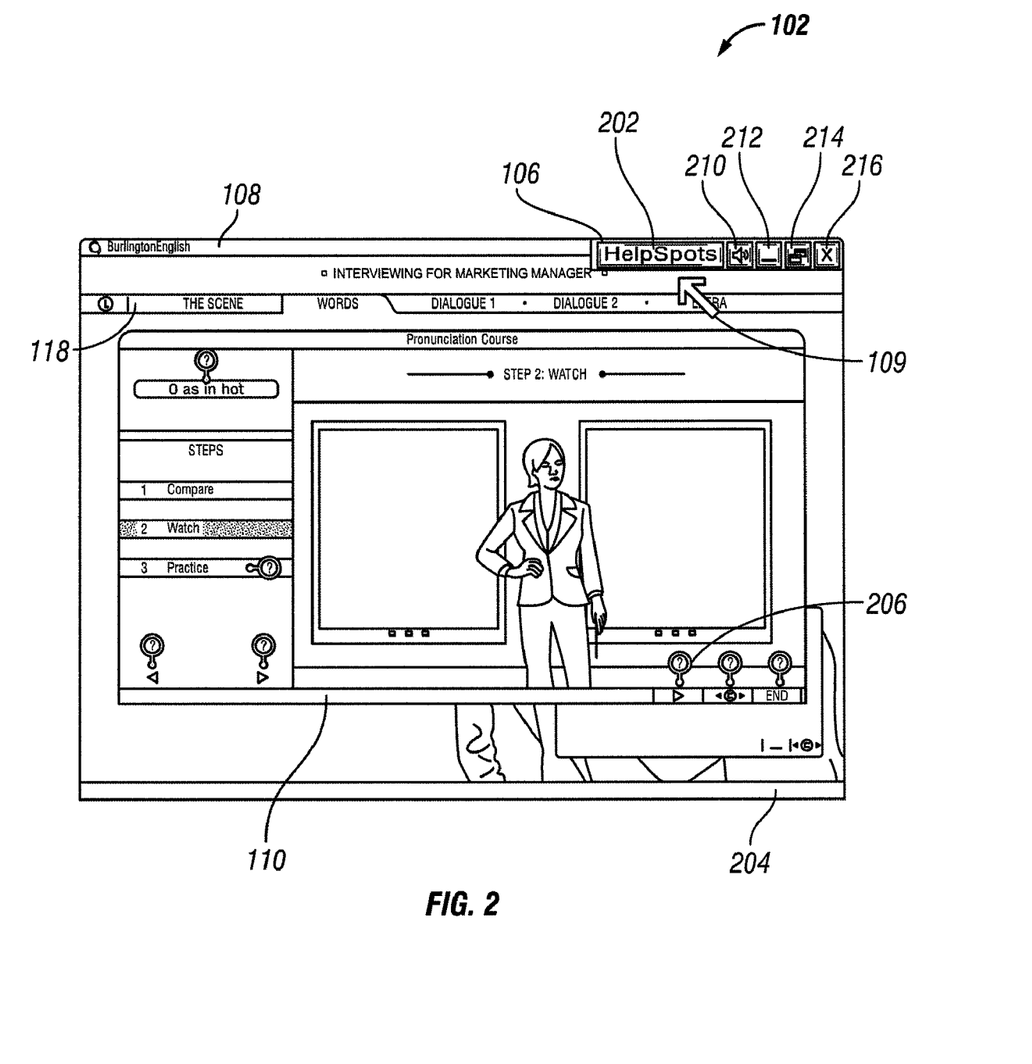
FIG. 2 shows the display window of FIG. 1 after a user has clicked on the HelpSpots button.

FIG. 2 shows the display screen 102 of FIG. 1 after a user has clicked on the HelpSpots button 202 of the HelpSpots information toolbar 106 in the window title bar 108 with the cursor 109, using the computer mouse (not illustrated). The HelpSpots button is located at the left-most area of the HelpSpots information toolbar and is used to initiate the "Help information mode" of the software application as described herein. Other areas of the information toolbar 106 may be used to provide the functionality of the HelpSpots button 202. Clicking on the HelpSpots button 202 initiates operation of the HelpSpots information mode. The HelpSpots information mode is initiated for the application window of the application that was active at the time the HelpSpots button was clicked. The application window 204 shown in FIG. 2 has been changed from the application window 104 shown in FIG. 1 in response to the user clicking on the HelpSpots button 202. In FIG. 2, the application window 204 indicates the mouse-sensitive areas of the lesson window 110. FIG. 2 shows that the application window is graphically masked or dimmed with an overlay as compared with the FIG. 1 depiction, to indicate that the software application is now operating in the Help information mode, while the mouse-sensitive areas are identified. This display alteration readily communicates to the user that the operation mode of the software application has changed from standard mode to the Help information mode, without changing the underlying active window. That is, when the user clicks on the HelpSpots button, the application operation is changed from the normal (unaltered) screen appearance of FIG. 1 into an information mode with the dimmed or grayed-out display of FIG. 2 that "freezes" operation of the underlying application window so that information in the underlying window is not changed while the HelpSpots information is accessed via the mouse-sensitive areas, and the mouse-sensitive areas on the screen are indicated. The information mode can be terminated by clicking on the HelpSpots button or by clicking in the grayed-out area of the display other than on an indicated mouse-sensitive area. In response to terminating the Help information mode depicted in FIG. 2, the display is returned to the FIG. 1 configuration.

In FIG. 2, all the mouse-sensitive areas of the application window 204 are clearly marked with a symbol comprising a question mark ("?") icon 206 placed near an associated display button, about which further information is available via the HelpSpots information toolbar 106 feature. The software application that produces the application window 204 will generate no response to movement of the mouse cursor 109 over the dimmed areas of the window. The software application will recognize and respond to clicking on any one of the mouse-sensitive areas identified with an icon such as the "?" icon 206 by providing supplemental information as described below. Only one of the "?" icons in FIG. 2 is identified with a reference numeral 206, but it should be understood that the description herein with respect to the identified icon 206 also applies to the other "?" icons depicted in FIG. 2, and likewise for all mouse-sensitive areas of all application windows with a HelpSpots button.

A HelpSpots button 202 is provided in each application window according to the configuration of the software application. That is, the software application is configured such that a choice is made to provide a HelpSpots button in an application window, independently of any other application windows of the software application. As noted above, the language learning application depicted in FIG. 1 includes multiple types of application windows, including the application window 104 and the lesson window 110. From the description above, it should be understood that the HelpSpots button 202 is provided with the application window 104, but the lesson window 110 is a subsidiary window (i.e., sub-class) and therefore the HelpSpots button displayed in the title bar 108 of the application window 104 invokes the Help information mode for the sub-class lesson window 110. In other words, the HelpSpots button 202 is always associated with the active window and is, itself, always active.

Figure 6:
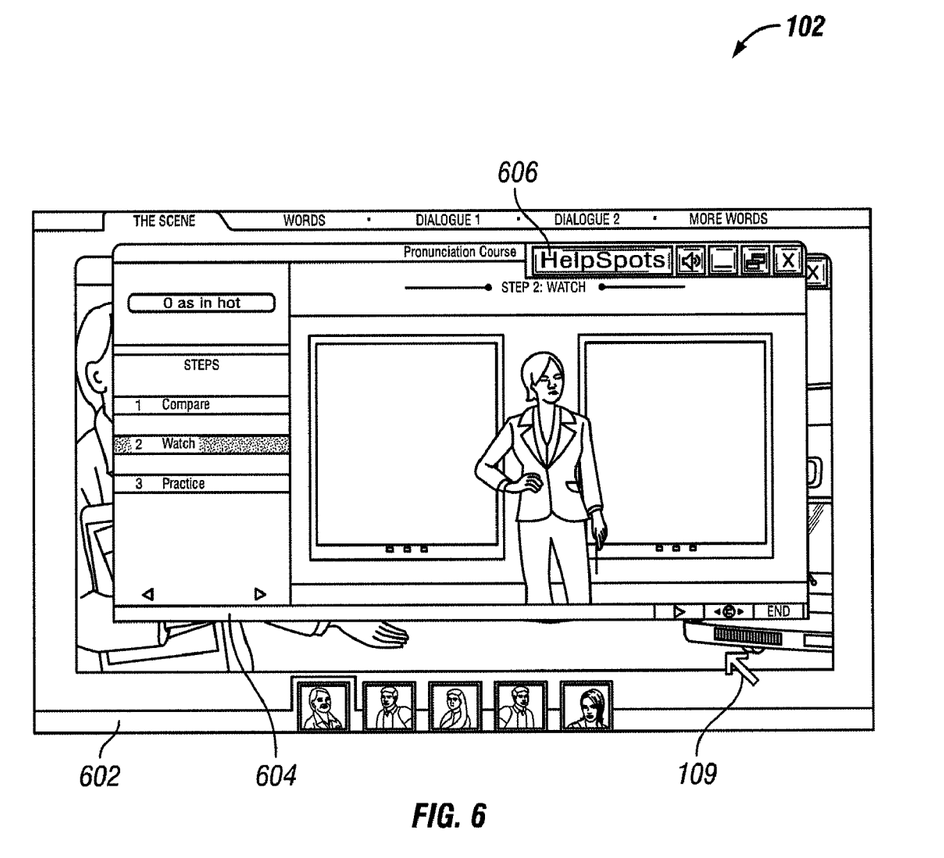
FIG. 6 shows a configuration of the software application in which a HelpSpots button is provided with one of the sub-class application windows.
Figure 7:
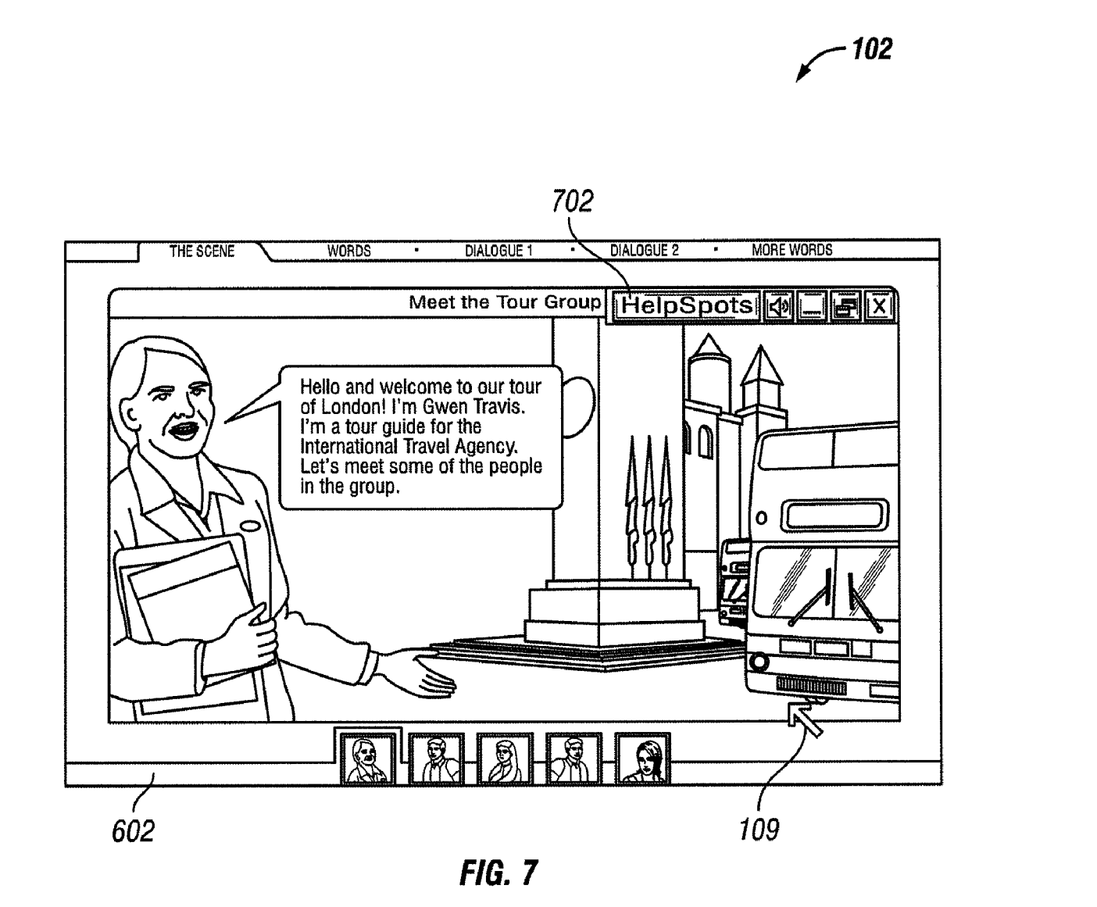
FIG. 7 shows a configuration of the software application after closing the sub-class window of FIG. 6.

FIG. 6 shows the display screen 102 with a configuration of the software application in which an application window 602 is shown with an active lesson application window 604 that is provided with a HelpSpots button 606. Selecting the HelpSpots button 606 provides an altered window with mouse-sensitive areas for the active application window indicated to provide supplemental information for the active window 604 as described above for the other embodiments. For the FIG. 6 configuration, closing the lesson window 604 returns the display screen 102 to showing the application window 602 without the lesson window, but with a HelpSpots button 702 in the title bar 108, as depicted in FIG. 7. Selecting the HelpSpots button 702 in the active application window 602 provides an altered window with mouse-sensitive areas for the active application window indicated to provide supplemental information for the active window as described above for the other embodiments.

For each type of window having a HelpSpots button, at least one mouse-sensitive area may be provided to initiate presentation of the information in response to clicking on a mouse-sensitive area, such as a default help index pop-up window. For example, in each application window having the HelpSpots button 202 displayed, selection of the HelpSpots button will produce a changed application window such as the dimmed view 204 shown in FIG. 2, with at least one mouse-sensitive area 206 indicated, such that clicking on the icon associated with the mouse-sensitive area using the cursor 109 will produce a pop-up window that provides information about the application to thereby assist the user.

Figure 3:
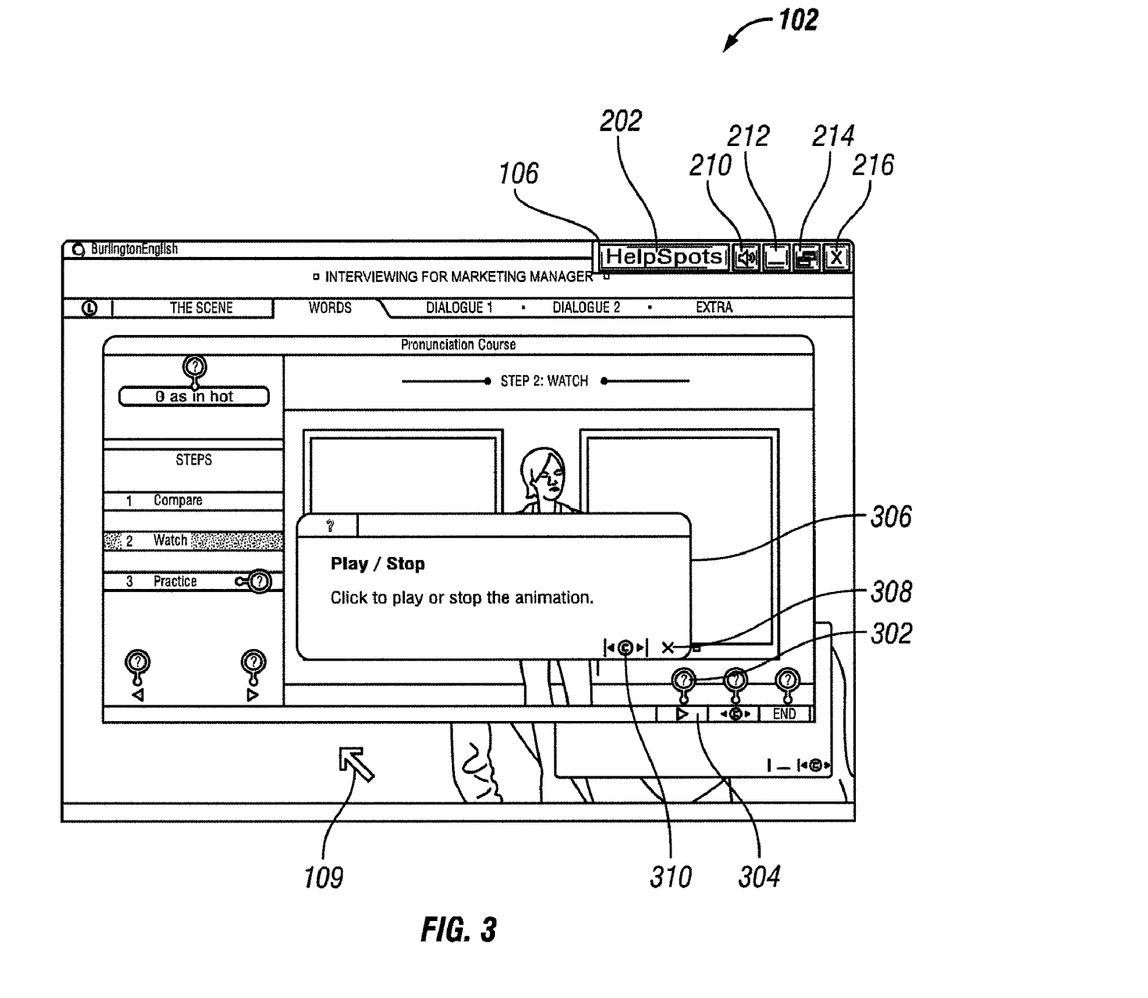
FIG. 3 shows the display window of FIG. 2 as changed after the question mark icon was clicked.

FIG. 3 shows the application window 204 of FIG. 2 after the "?" question mark icon 302 at the Play button 304 display feature was clicked with the cursor 109. Clicking on the icon 302 produced an information pop-up window 306 with "Help" information about the associated active window display feature (the Play button). The pop-up window 306 is produced on the display device in response to the detected mouse event (i.e., click) in the mouse-sensitive area such that the pop-up window provides information related to the associated active window feature.

The pop-up window 306 can be provided with buttons to control display of the pop-up window and for closing it, as well as other navigation aids. For example, the FIG. 3 pop-up window 306 includes a "close" button 308 to close the pop-up window and a "play" button 310 to initiate presentation of a multimedia clip to provide the information associated with the icon for the mouse-sensitive area. If the user clicks on an icon 302 for any one of the other mouse-sensitive areas 206 indicated in FIG. 2, then a corresponding pop-up window 306 is produced on the application window, with assistance information that is associated with the clicked icon or indicated window feature.

As noted above, the HelpSpots information toolbar 106 as illustrated in the drawings can be moved to different locations of the application window during operation of the associated software application. The information toolbar was displayed in FIG. 1 at the upper right corner of the application window, as an example. Alternatively, the HelpSpots information toolbar 106 can be embedded into the application window title bar 108 or may be embedded in the menu bar 118 (FIG. 1) of an application window. For example, FIG. 6 shows the HelpSpots button 202 moved to the bottom of the application window 104. The software application is configured to permit such real-time movement during execution of the application.

As shown in the drawings, in addition to the HelpSpots button 202, the HelpSpots information toolbar can include buttons that control audio features 210, location 212, sizing 214, and appearance or close 216 of the toolbar, as is typically available with window-based operating systems and software applications. If desired, audio and/or video assistance can be provided via the audio button of the HelpSpots information toolbar, such as to initiate playback of an audio clip or video or multimedia clip.

The information provided by selecting a mouse-sensitive area can be provided locally by data stored in the host computer system or can come from a network source, or can come from a combination of local and network sources. Thus, in addition to or in substitution for the local assistance information, a network link can be provided for online assistance. The network link can be selected via a button on the HelpSpots information toolbar, or can be selected from a drop-down menu or a pop-up window, as described above, or by a combination of one or more of these selection features.

The HelpSpots button may take different shapes and forms, though all shapes and forms will facilitate initiating the Help information mode upon being clicked by the user with the cursor. For example, a single HelpSpots button may be provided in the application display, rather than a multi-button information toolbar. In that case, the single-button information toolbar would be generated such that only the HelpSpots button 202 would be visible in the HelpSpots idle condition, with no other toolbar buttons visible on the display screen 102. Providing a single-button HelpSpots information toolbar in this way may simplify the operation for the user. For example, selection of the single HelpSpots button with the cursor may initiate drop-down menus from the button or pop-up windows on the display screen for feature selection and assistance operation.

When the user initiates a Help information pop-up window 306 and clicks on the "close" button 308, the pop-up window is closed and the mouse-sensitive areas are displayed again, waiting for user selection. That is, the window is changed from showing the pop-up window (FIG. 3) back to the "idle" condition of the HelpSpots information feature (FIG. 2), showing the mouse-sensitive areas for the current active window of the software application. When the user views the HelpSpots information feature in the idle condition of FIG. 2 and clicks on the HelpSpots close button 126 of the information toolbar 106, the operation of the software application is changed to "normal" or "standard" mode, and the application may be used as normal. That is, the HelpSpots information mode is terminated, but remains ready for activation by selection of the HelpSpots button 202.

Figure 4:
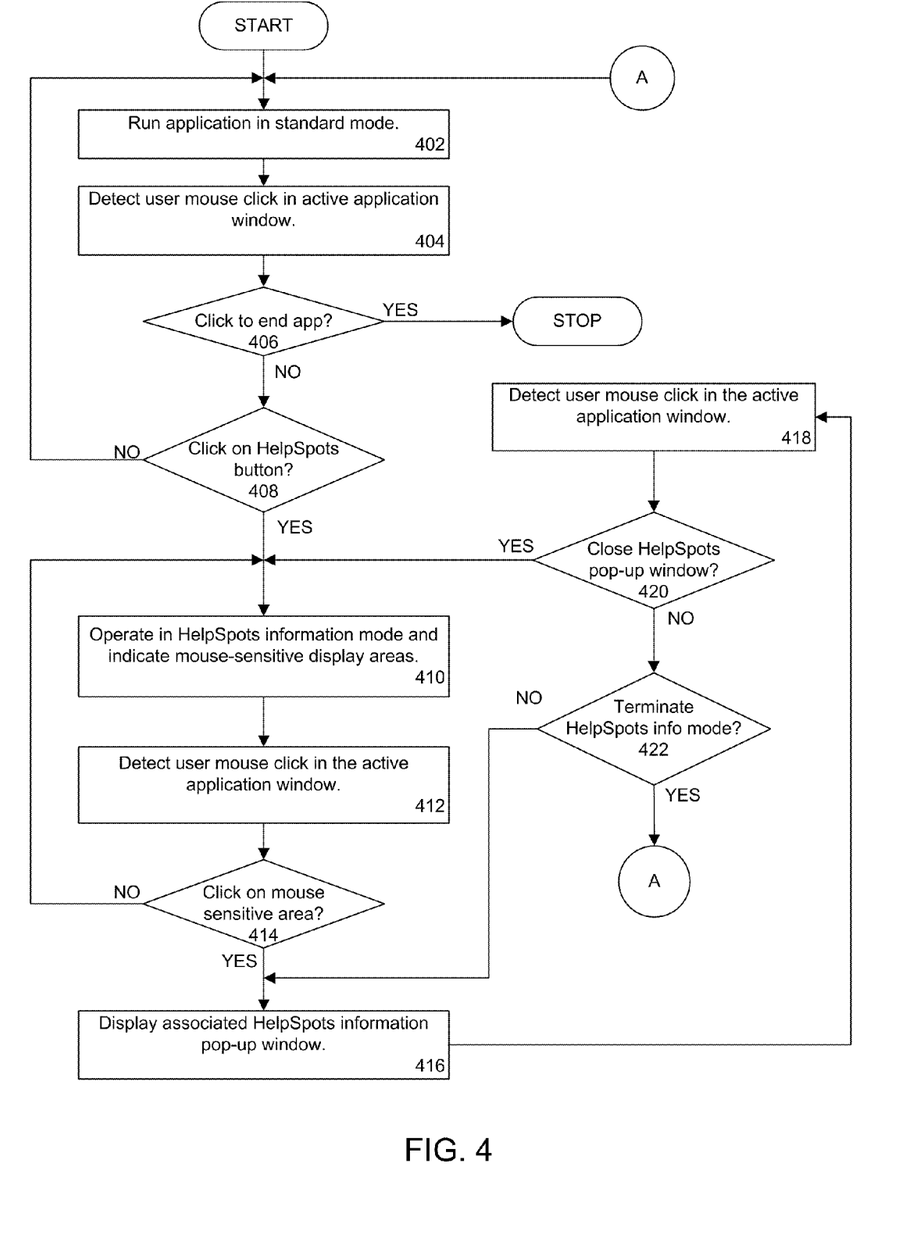
FIG. 4 is a flowchart of system operations in providing the software application with display of mouse-sensitive areas.

FIG. 4 is a flowchart that shows operations executed by the host computer system to provide the features described herein. In the first operation 402, the software application is running on the host computer system is a "normal" run mode, also referred to as standard mode. In standard mode, the system operates such that it "listens" for mouse activity. When the user performs a mouse click on the display screen, it is detected 404. At the decision box 406, the computer system checks to see if the user clicked to shut down the application. If the user did click on the "shut down" button, an affirmative outcome at the box 406, then operation of the application is stopped. If the user did not click on "shut down", a negative outcome at the box 406, then at box 408 the system checks to determine if the user clicked on the HelpSpots button 202. If the user did not click on the HelpSpots button, a negative outcome at the box 408, then operation of the application continues as normal and system execution returns to the first box 402. If the user clicked on the HelpSpots button, an affirmative outcome of the decision box 408, then the system enters the help information mode of operation and moves to box 410.

At box 410, the system operates in the Help information mode such as depicted in FIG. 2 and displays the mouse-sensitive areas of the application window. During the Help information mode, the application listens for mouse activity. When the user performs a mouse click on the display screen, it is detected at box 412. At the decision box 414, the computer system checks to see if the user clicked on a mouse-sensitive area. If the user did not click on a mouse-sensitive area, a negative outcome at the box 414, then the system ignores the mouse activity and continues to operate in the Help information mode, waiting for relevant mouse activity. If the user did click on a mouse-sensitive area, an affirmative outcome at the box 414, then the application is operated to display an information pop-up window associated with the mouse-sensitive area (box 416). This operation corresponds to the FIG. 3 illustration.

After the Help information pop-up window is displayed, the system again waits and detects a mouse click from the user at box 418. Upon detecting a user mouse click event, the system checks to determine if the click was on the "close" button of the information pop-up window menu (see 308 of FIG. 3). If the user clicked the HelpSpots "close" button 308, an affirmative outcome at box 420, then the HelpSpots information pop-up window is closed and operation is returned to the FIG. 2 depiction with display of the mouse-sensitive areas, waiting for the next mouse event. If the "close" button was not clicked, a negative outcome at the decision box 420, then the system checks for a HelpSpots termination command at box 422. If the HelpSpots close button 216 was selected from FIG. 2, then the HelpSpots information mode of operation is terminated and the operation of the software application is returned to standard mode, as indicated by the "A" connector in FIG. 4. If the HelpSpots close button was not selected (see the FIG. 2 depiction), a negative outcome at box 422, then the user clicked on an area of the window that was not mouse-sensitive and the mouse activity is ignored. Therefore, operation of the HelpSpots information feature returns to the idle state at box 416 without change to the display, with continued display of the information pop-up window.

The type of information provided and the presentation of the information provided in response to clicking the HelpSpots button 202 can be variable. Although the HelpSpots information toolbar is described herein in the context of providing assistance, or "Help" features, other types of information can be provided in the same manner. That is, clicking on the HelpSpots button initiates a change in operation of the host application from a normal operation mode to an information mode in which mouse-sensitive areas of an application window are indicated, such as with a "?" icon, and selecting a mouse-sensitive area in the information mode initiates a pop-up window that provides help, assistance, or supplemental information about a display feature or artifact associated with the "?" icon, and the information that is provided via the pop-up window may take the form of text, graphics, audio and video clips, and the like, or any combination of them.

The HelpSpots information toolbar can be provided via programming code using a variety of techniques. For example, the information toolbar may be provided by code that is executed through a script hosted by the computer system, or the toolbar may be provided by programming code installed into the operating system of the host computer system, or the information toolbar may be provided by the host application itself, or supplied as a plug-in to the application, or the like. A variety of hardware configurations and operating environments are suitable to provide the operating environment in which software applications with multiple windows are produced and the HelpSpots information toolbar is provided.

Exemplary Implementations

The systems and methods described above may be implemented in a number of ways. One such implementation includes various electronic components. For example, units of the various systems may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 5:
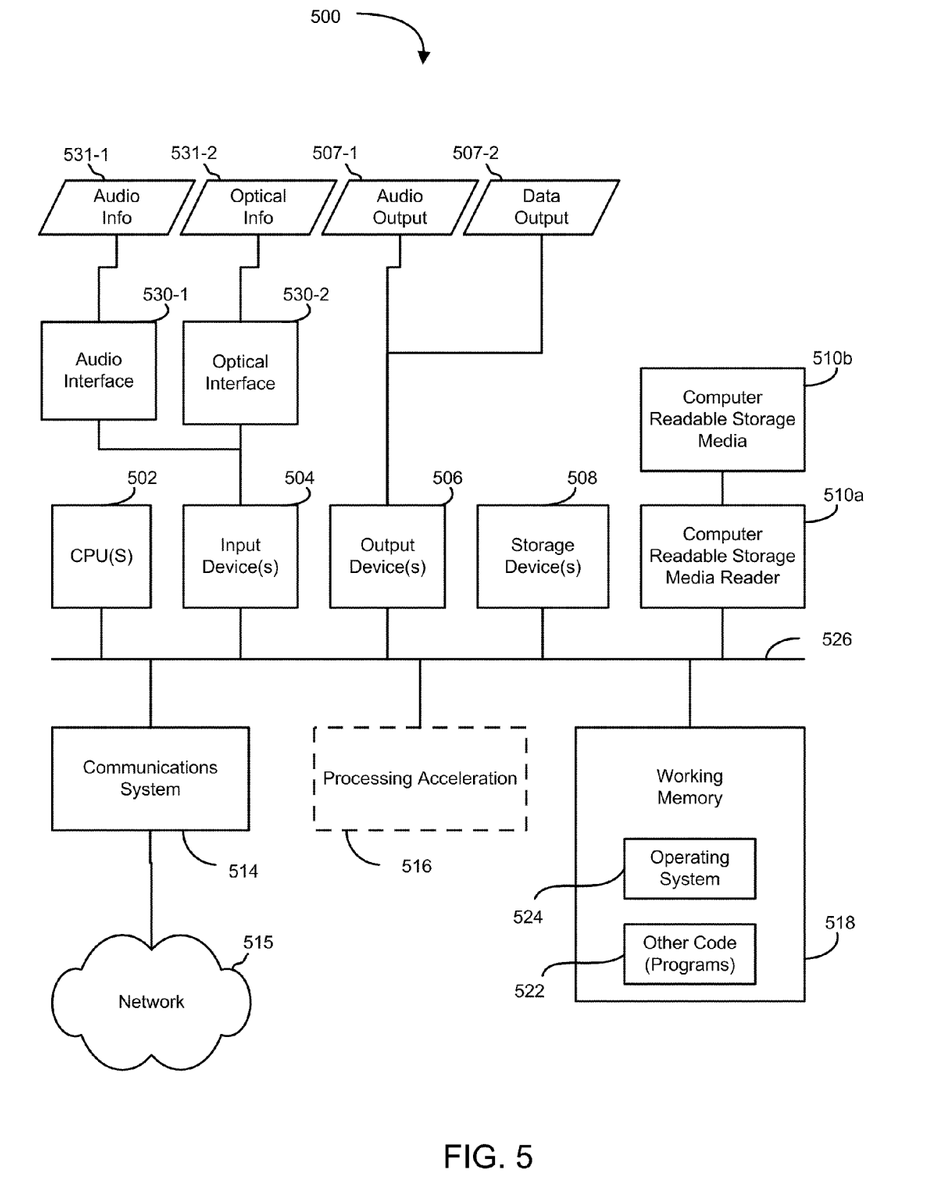
FIG. 5 is a block diagram of a computer system configured to perform the operations of FIG. 4.

FIG. 5 provides a block diagram of a computer system 500 for implementing embodiments of the invention. The computer system 500 may function as the host computer system that produces the window displays shown in FIGS. 1-3 and FIGS. 6-7. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a system bus 526 (or may otherwise be in communication, as appropriate). The hardware elements can include one or more central processor units (CPUs) 502, including without limitation one or more general-purpose processors and/or one or more special-purpose processors (such as communication processing chips, graphics acceleration chips, and/or the like); one or more input devices 504, that can include, without limitation, a mouse, a keyboard, and/or the like; and one or more output devices 506, which can include without limitation a display device, a printer, audio device, and/or the like. Thus, the display screen 102 illustrated in FIGS. 1-3 and FIGS. 6-7 comprises one of the output devices 506.

The computer system 500 may further include (and/or be in communication with) one or more storage devices 508, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computer system 500 might also include a communications subsystem 514, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 514 may permit data to be exchanged with a network 515, and/or any other devices described herein. The network 515 may comprise a local area network (LAN) or a network such as the Internet, or a combination. In many embodiments, the computer system 500 will further include a working memory 518, which can include a RAM or ROM device, as described above. The system may optionally include processing acceleration 516 to assist with processing, such as arithmetic computations, graphical computations, and the like.

The computer system 500 also may comprise software elements, shown as being currently located within the working memory 518, including an operating system 524 and/or other code, such as one or more software applications 522, which may comprise computer programs performing tasks and operations described above, and/or may be designed to implement methods in accordance with the invention and/or to configure systems in accordance with the invention, as described herein. Merely by way of example, one or more procedures described with respect to the method(s) discussed above might be implemented as code and/or instructions executable by a computer (and/or a processor within a computer). In one embodiment, the data generating and presenting operations are implemented as application programs 522. In the description herein, references to "interface" and "processor" and "application" should be understood as referring to hardware, software, and combinations of the two, either as independent components (hardware, software, and/or both) for each interface, processor, or application, or as integrated components combined with one or more other components.

A set of these instructions and/or code may be stored on a computer readable storage medium 510b. In some embodiments, the computer readable storage medium 510b may comprise the storage device(s) 508 described above. In other embodiments, the computer readable storage medium 510b might be incorporated within the computer system. In still other embodiments, the computer readable storage medium 510*b* might be separate from the computer system (i.e., it may be a removable readable medium, such as a compact disc, and the like), and or might be provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, and the like), then takes the form of executable code. In these embodiments, the computer readable storage medium 510*b* may be read by a computer readable storage media reader 510*a*.

It will be apparent to those skilled in the art that substantial variations may be made in accordance with specific requirements. For example, customized hardware might also be used, and/or particular elements might be implemented in hardware, software (including portable software, such as applets and the like), or both. Further, connection to other computing devices such as network input/output devices may be employed.

In some embodiments, one or more of the input devices 504 may be coupled with an audio interface 530-1. The audio interface 530-1 may be configured to receive audio information by interfacing with a microphone, instrument, digital audio device, or other audio signal or file source. In other embodiments, one or more of the input devices 504 may be coupled with an optical interface 530-2. The optical interface 530-2 may be configured to receive optical information 531-2 by interfacing with a camera, scanner, digital imaging device, or other digital image source.

Further, in some embodiments, one or more of the output devices 506 may be coupled with an audio output device 507-1. The audio output device 507-1 may be configured to output audio signal data generated by embodiments of the invention to one or more systems or devices capable of handling that data, for example a speaker, audio component, digital-to-analog converter, compact disc writer, and the like. In other embodiments, one or more of the output devices 506 may be coupled with a data output device 507-2. The data output device 507-2 may be configured to output data generated by embodiments of the invention to one or more systems or devices capable of handling that data, for example data processing software, publication systems, file storage devices, and the like.

In one embodiment, the embodiment employs local and remote computer systems (such as the computer system 500) to perform methods of the invention. According to a set of embodiments, some or all of the procedures of such methods are performed by the computer system 500 in response to the processor 502 executing one or more sequences of one or more instructions (which might be incorporated into the operating system 524 and/or other code, such as an application program 522) contained in the working memory 518. Such instructions may be read into the working memory 518 from another machine-readable medium, such as one or more of the storage device(s) 508 (or 510). Merely by way of example, execution of the sequences of instructions contained in the working memory 518 might cause the processor(s) 502 to perform one or more procedures of the methods described herein. For example, the assistance information selected from a pop-up window may be provided from a network source rather than directly from the host computer.

The terms "machine readable medium" and "computer readable medium," as used herein, refer to any medium that participates in providing data that causes a machine to operate in a specific fashion. In an embodiment implemented using the computer system 500, various machine-readable media might be involved in providing instructions/code to processor (s) 502 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (708 or 510). Volatile media includes, without limitation, dynamic memory, such as the working memory 518. Transmission media includes coaxial cables, copper wire, and fiber optics, including the wires that comprise the bus 526, as well as the various components of the communication subsystem 514 (and/or the media by which the communications subsystem 514 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 502 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals, and/or the like, are all examples of carrier waves on which instructions can be encoded, in accordance with various embodiments of the invention.

The communications subsystem 514 (and/or components thereof) generally will receive the signals, and the bus 526 then night carry the signals (and/or the data, instructions, etc. carried by the signals) to the working memory 518, from which the processor(s) 502 retrieves and executes the instructions. The instructions received by the working memory 518 may optionally be stored on a storage device 508 either before or after execution by the processor(s) 502.

Those skilled in the art will be able to configure a computer system such as depicted in the block diagram of FIG. 5 such that it provides the features described above with respect to FIGS. 1-4, in view of the description herein. The software application, operating system, and information toolbar and associated operations can be provided by appropriate programming code stored in the working memory 518 executed by the processor 502. The user as described above can launch the software application, initiate the standard mode of operation and the Help information mode of operation, by using the input devices 504 such as the mouse to manipulate the cursor on the output devices 506 such as a display device. If the programming code to provide the information toolbar and associated operations is obtained independently of the software application for installation, the programming code can be easily obtained by readable storage media 510 or over the network 515.

The present invention has been described above in terms of presently preferred embodiments so that an understanding of the present invention can be conveyed. There are, however, many configurations for providing assistance features not specifically described herein but with which the present invention is applicable. The present invention should therefore not be seen as limited to the particular embodiments described herein, but rather, it should be understood that the present invention has wide applicability with respect to application processing generally. All modifications, variations, or equivalent arrangements and implementations that are within the scope of the attached claims should therefore be considered within the scope of the invention.

What is claimed is:

1. A computer method for operating a computer system, the computer method comprising:
   executing a software application in a window operating system to provide a display window of an active application on a display device of the computer system wherein the software application operates in a standard mode wherein an information button is displayed in the display window of the active application;
   responding to a detected mouse click on the information button by initiating an information mode of the software application in which at least one mouse-sensitive area is indicated in the display window of the active application, wherein the mouse-sensitive area is maintained in the display window and is altered in appearance as compared with other areas of the display window continuously during the information mode, wherein the mouse-sensitive area is associated with a feature of the display window of the active application, and wherein a pop-up window is produced on the display device in response to a detected mouse event in the mouse-sensitive area and the pop-up window provides information related to the associated active application display window feature;
   wherein the information mode freezes operation of the display window of the active application and alters the appearance of the display window, wherein the display window has a dimmed appearance with an icon for each mouse-sensitive area of the display window.

2. The method according to claim 1, further including responding to a mouse click on a close feature of the display window by terminating the information mode.

3. The method according to claim 2, wherein the close feature comprises the information button, or cursor location on the display window other than a mouse-sensitive area.

4. The method according to claim 1, wherein the information button comprises a movable information toolbar.

5. The method according to claim 4, wherein the movable information toolbar includes features to control display of the information toolbar.

6. The method according to claim 1, wherein the information mode of the software application is provided by code that is installed into the application.

7. The method according to claim 1, wherein the pop-up window includes features to control providing the information related to the associated display window feature.

8. The method according to claim 1, wherein a plurality of mouse-sensitive areas are indicated in the display window of the active application, and wherein each one of the plurality of mouse-sensitive areas is associated with a different feature of the display window and produces a different pop-up window on the display device in response to a detected mouse event in the corresponding mouse-sensitive area.

9. A computer system comprising:
   a processor;
   working memory containing data that, when executed by the processor, produces an operating system and a software application executing in the operating system that responds to user action comprising cursor operation;
   wherein the processor executes the software application so as to provide a display window of an active application on a display device of the computer system wherein the software application operates in a standard mode wherein an information button is displayed in the display window of the active application, and the software application responds to a detected mouse click on the information button by initiating an information mode of the software application in which at least one mouse-sensitive area is indicated in the display window of the active application, wherein the mouse-sensitive area is maintained in the display window and is altered in appearance as compared with other areas of the display window continuously during the information mode, wherein the mouse-sensitive area is associated with a feature of the display window of the active application, and wherein a pop-up window is produced on the display device in response to a detected mouse event in the mouse-sensitive area and the pop-up window provides information related to the associated active application display window feature;
   wherein the information mode freezes operation of the display window of the active application and alters the display window, wherein the display window has a dimmed appearance with an icon for each mouse-sensitive area of the display window.

10. The system according to claim 9, wherein the processor executes the software application so that it responds to a mouse click on a close feature of the display window by terminating the information mode.

11. The system according to claim 10, wherein the close feature comprises the information button, or cursor location on the display window other than a mouse-sensitive area.

12. The system according to claim 9, wherein the information button comprises a movable information toolbar.

13. The system according to claim 12, wherein the movable information toolbar includes features to control display of the information toolbar.

14. The system according to claim 9, wherein the information mode of the software application is provided by code that is installed into the application.

15. The system according to claim 9, wherein the pop-up window includes features to control providing the information related to the associated display window feature.

16. The system according to claim 9, wherein a plurality of mouse-sensitive areas are indicated in the display window of the active application, and wherein each one of the plurality of mouse-sensitive areas is associated with a different feature of the display window and produces a different pop-up window on the display device in response to a detected mouse event in the corresponding mouse-sensitive area.

* * * * *